US012800859B2

(12) United States Patent
Chmurski et al.

(10) Patent No.: US 12,800,859 B2
(45) Date of Patent: Nov. 17, 2026

(54) THIN FILM BUNDLED CABLE

(71) Applicant: CORNING RESEARCH & DEVELOPMENT CORPORATION, Corning, NY (US)

(72) Inventors: Mateusz Chmurski, Dmosin (PL); Dorota Lagwa, Lodz (PL); Sebastian Olszewski, Aleksandrów (PL); Tomasz Stolarczyk, Swędów (PL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 283 days.

(21) Appl. No.: 18/527,939

(22) Filed: Dec. 4, 2023

(65) Prior Publication Data

US 2024/0103240 A1 Mar. 28, 2024

Related U.S. Application Data

(63) Continuation of application No. PCT/US2022/031768, filed on Jun. 1, 2022.

(60) Provisional application No. 63/208,165, filed on Jun. 8, 2021.

(51) Int. Cl.
*G02B 6/44* (2006.01)

(52) U.S. Cl.
CPC ........... *G02B 6/4432* (2013.01); *G02B 6/441* (2013.01); *G02B 6/4431* (2023.05)

(58) Field of Classification Search
CPC ..... G02B 6/441; G02B 6/4431; G02B 6/4432
See application file for complete search history.

(56) References Cited

U.S. PATENT DOCUMENTS

| | | | | |
|---|---|---|---|---|
| 5,155,789 A * | 10/1992 | Le Noane | G02B 6/443 | 385/102 |
| 5,751,879 A * | 5/1998 | Graham | G02B 6/4479 | 385/103 |
| 6,205,277 B1 * | 3/2001 | Mathis | G02B 6/449 | 385/103 |
| 6,334,015 B2 * | 12/2001 | Jamet | G02B 6/441 | 385/100 |

(Continued)

OTHER PUBLICATIONS

International Search Report and Written Opinion of the International Searching Authority; PCT/US2022/031768; mailed on Sep. 9, 2022, 11 pages; International Searching Authority.

(Continued)

*Primary Examiner* — Ryan A Lepisto
(74) *Attorney, Agent, or Firm* — Thomas R. Irwin

(57) ABSTRACT

A fiber optic cable includes a core comprising a plurality of cable subunits configured such that an outer group of cable subunits surrounds a central cable subunit. each cable subunit includes one or more optical fibers, a buffer tube surrounding the one or more optical fibers, a strength layer surrounding the buffer tube, and a subunit jacket surrounding the strength layer. A thin film outer sheath surrounds the core, wherein the thin film outer sheath loads the outer group of cable subunits normally to the central cable subunit such that contact between the outer group of cable subunits and the central cable subunit provides coupling therebetween, limiting axial migration of the outer group of cable subunits relative to the central cable subunit.

22 Claims, 1 Drawing Sheet

(56) References Cited

U.S. PATENT DOCUMENTS

| | | | | |
|---|---|---|---|---|
| 6,483,971 | B2 * | 11/2002 | Gaillard | G02B 6/4433 385/113 |
| 6,658,184 | B2 * | 12/2003 | Bourget | G02B 6/443 385/100 |
| 6,973,246 | B2 * | 12/2005 | Bocanegra | G02B 6/441 385/100 |
| 7,054,531 | B2 * | 5/2006 | Hurley | G02B 6/441 385/103 |
| 7,082,241 | B2 * | 7/2006 | Jamet | G02B 6/4438 385/100 |
| 7,778,511 | B1 | 8/2010 | Bradley et al. | |
| 7,860,361 | B2 * | 12/2010 | Ginocchio | G02B 6/4494 385/103 |
| 8,467,645 | B2 * | 6/2013 | Keller | G02B 6/4494 385/104 |
| 8,494,327 | B2 * | 7/2013 | Keller | G02B 6/4411 385/112 |
| 8,620,124 | B1 * | 12/2013 | Blazer | G02B 6/4413 385/102 |
| 8,855,455 | B2 * | 10/2014 | Keller | G02B 6/441 385/112 |
| 9,557,503 | B2 * | 1/2017 | Guenter | G02B 6/4432 |
| 11,181,706 | B2 * | 11/2021 | Kaji | G02B 6/4413 |
| 2003/0035635 | A1 * | 2/2003 | Chastain | G02B 6/4401 385/103 |
| 2005/0244115 | A1 | 11/2005 | Bocanegra et al. | |
| 2008/0193091 | A1 * | 8/2008 | Herbst | G02B 6/44384 385/111 |
| 2016/0041354 | A1 | 2/2016 | Guenter et al. | |
| 2016/0054531 | A1 * | 2/2016 | Baca | G02B 6/4432 385/110 |
| 2016/0266342 | A1 * | 9/2016 | Ellis | G02B 6/4436 |
| 2016/0306129 | A1 | 10/2016 | Hurley et al. | |
| 2016/0306130 | A1 | 10/2016 | Bringuier et al. | |
| 2018/0252884 | A1 * | 9/2018 | Quinn | G02B 6/4413 |
| 2021/0055493 | A1 | 2/2021 | Gallo et al. | |
| 2021/0341696 | A1 * | 11/2021 | Akinosho | G02B 6/4454 |

OTHER PUBLICATIONS

Extended European search report, EP application No. 22820782.5, dated Mar. 4, 2025, 8 pages, European Patent Office.

* cited by examiner

THIN FILM BUNDLED CABLE

CROSS-REFERENCE TO RELATED APPLICATION

This application is a continuation of International Patent Application No. PCT/US2022/031768 filed Jun. 1, 2022, which claims the benefit of priority under 35 U.S.C. § 119 of U.S. Provisional Application Ser. No. 63/208,165, filed on Jun. 8, 2021, the content of which is relied upon and incorporated herein by reference in its entirety.

BACKGROUND

Aspects of the present disclosure relate generally to cables, such as fiber optic cables that may support and carry optical fibers as well as other cable components. More specifically, aspects of the present disclosure relate to a cable having a group of individual drop cables bundled together with a thin film binder for constraining and protecting elements of the bundled cable.

Conventional loose tube cables often incorporate a plurality of buffer tubes that are stranded, often about a central strength member, to form a cable core. Often these cables rely on binder yarns that are counter-helically wrapped about a core of the cable to constrain the stranded buffer tubes containing optical fibers, particularly with arrangements of the buffer tubes that include reverse-oscillatory winding patterns of the buffer tubes where the lay direction of the buffer tubes periodically reverses around a (straight) central strength member along the length of the core. The central strength member is typically a rod of a rigid material. Buffer tubes are typically cylindrical tubes (generally 2 to 3 mm in outer diameter) that contain optical fibers. In other conventional embodiments, a thin film may be extruded over a core of stranded buffer tubes with binder yarns removed and then a jacket extruded over the thin film bound core. An outer cable jacket is extruded around the bound core to provide sufficient environmental protection and ensure mechanical performance. However, there is still a need for innovative cables that provide even easier and more efficient fiber delivery in a drop cable scenario without sacrificing the necessary stability and reliability of transmission parameters.

SUMMARY

Aspects of the present disclosure provide for a fiber optic cable which includes a core and a thin film outer sheath surrounding the core. The core comprises a plurality of drop cables in a generally non-stranded configuration which reduces installation and environmental influences on the transmission parameters of the fibers while allowing for easy accessibility to the individual drop cables for separation of each drop cable from the bundle. The thin film binder is in radial tension around the core such that the thin film binder substantially opposes outwardly transverse deflection of the drop cables, maintains a tight configuration of the cable bundle during installation, and helps protect the bundled drop cables from environmental influences.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures and/or described elsewhere in the text.

Figure 1:
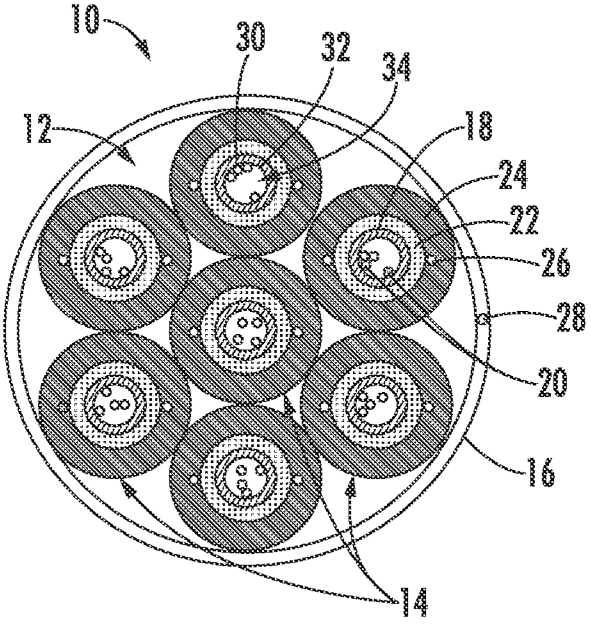
FIG. 1 is a cross-sectional view of a fiber optic cable, according to aspects of the present disclosure.
Figure 2:
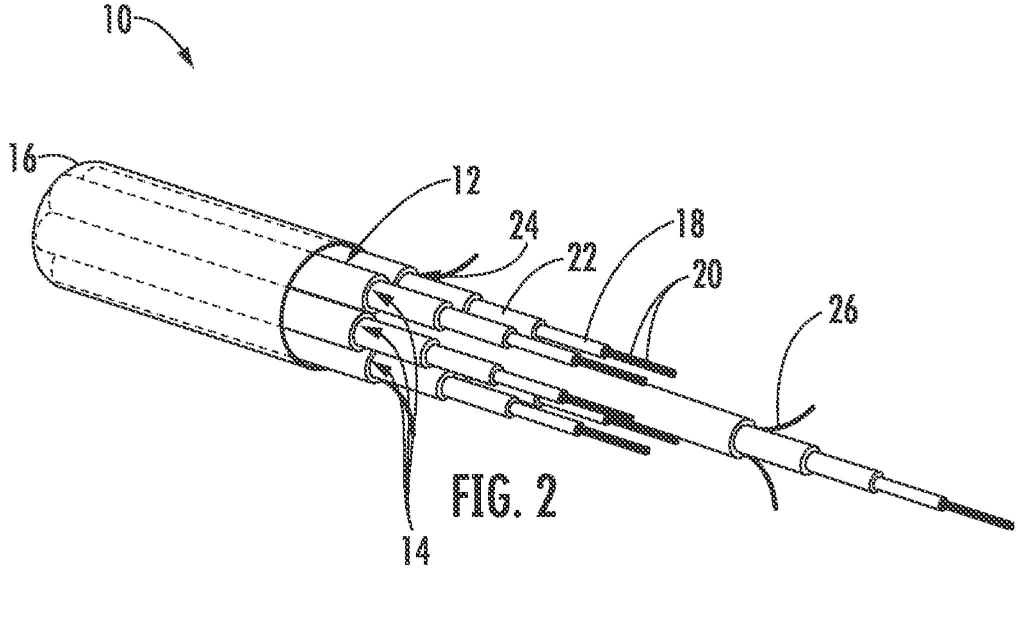
FIG. 2 is a perspective view of the fiber optic cable shown in FIG. 1, according to aspects of the present disclosure.

Referring to FIGS. 1 and 2, a fiber optic cable 10 includes a core 12 comprised of a plurality of cable subunits 14. The cable subunits 14 may be a plurality of optical fiber cables, electrically conductive cables, composite cables, dummy cables, or any combination of each. In accordance with aspects of the present disclosure, and as shown in FIG. 1, the fiber optic cable 10 may include seven cable subunits 14 configured such that six of the cable subunits form an outer group of cable subunits concentrically surrounding a central subunit cable. An outer sheath 16 in the form of a thin film binder surrounds the core 12 of the cable 10.

Each of the cable subunits 14 comprises a buffer tube 18 surrounding one or more optical fibers 20. As shown in FIG. 1, each buffer tube 18 may include four optical fibers such that the cable 10 has a total of twenty-eight optical fibers, four optical fibers 20 in each of the seven cable subunits 14. A strength layer 22 surrounds the buffer tube 20 and a subunit jacket 24 is extruded to surround the strength layer 22. The strength layer 22 may provide tensile strength along the length of the cable subunit 14 and be comprised of strands of a strengthening material, such as fiberglass yarn, fiberglass rods, aramid, steel wires, and/or other suitable yarns (e.g., basalt yarns). The strength layer 22 may comprise a combination of fiberglass and aramid yarn, for example, and the strands may be wound around the buffer tube to form the strength layer 22. A water-swellable tape may be provided between the strength layer 22 and the subunit jacket 24. One or more subunit ripcords 26 may be co-extruded or provided to be wholly or partially embedded in the subunit jacket 24 to provide an efficient mechanism to open the subunit jacket 24 for access to the buffer tube 18 and/or optical fibers 20. Similarly, a sheath ripcord 28 may be co-extruded or provided in the outer sheath 16. In this manner, individual cable subunits 14 may be easily accessed and/or separated from the bundled cable 10 via access directly through the thin outer sheath 16 or use of the sheath ripcord 28. Ensuring each of the cable subunits 14 individually has sufficient strength to protect the fibers 20 allows use of the thin film outer sheath 16 in cable 10.

As shown in FIG. 1, optical fibers 20 may be generally loosely packed within the buffer tube 18. Buffer tube 18 includes an outer surface 30 that defines the exterior surface of the buffer tube and an inner surface 32 that defines a channel, shown as central bore 34. The optical fibers 18 are located within central bore 34. In various embodiments, optical fibers 18 may be loosely packed within buffer tube 20, although optical fiber ribbons, including flexible optical fiber ribbons, may be used rather than loose fibers. In various embodiments, central bore 34 may include additional materials, including water blocking materials, such as water swellable gels, tube filling compounds, water-swellable yarns, or an absorbent polymer (e.g., super-absorbent polymer particles or powder).

Buffer tube 18 may comprise a single extruded material or have multiple layers of material forming the buffer tube 18. In accordance with the present disclosure, buffer tube 18 comprises an inner layer and an outer layer, both layers combined defining the radial wall thickness of the buffer tube 18. In accordance with aspects of the present disclosure, the inner layer may be made from a suitable polymer material, such as a polycarbonate (PC) material, and the outer layer is formed from one or more polymer materials such as polybutylene terephthalate (PBT). The inner and outer layers may be coextruded layers such that the ratio of the thickness of the inner layer to the outer layer is approximately equal. In various embodiments, buffer tube 18 is sized to provide sufficient protection to optical fibers 20. In the embodiment shown in FIGS. 1 and 2, buffer tube 18 has a radial wall thickness between 0.15 mm and 0.25 mm, more specifically about 0.20 mm (e.g., 0.20 mm plus or minus 0.05 mm). Prior to distortion under radial forces, an outside diameter of buffer tube 18 is between 1.6 mm and 1.8 mm, more specifically about 1.7 mm (e.g., 1.7 mm plus or minus 0.05 mm). In addition, prior to distortion under radial forces, an inner diameter of buffer tube 18 is between 1.2 mm and 1.3 mm, specifically about 1.3 mm (e.g., 1.3 mm plus or minus 0.05 mm). In general, the ratio of the inner diameter to the outer diameter of the buffer tube is about 0.8 (e.g., 0.8 plus or minus 0.1).

The subunit jacket 24 may comprise an extrudable polymer material that may include one or more of medium-density polyethylene (MDPE), high-density polyethylene (HDPE), low-density polyethylene (LDPE), linear low-density polyethylene (LLDPE), and/or polypropylene (PP), among others. The subunit jacket 24 may have a subunit wall thickness of between 0.60 mm and 0.90 mm, more specifically about 0.75 mm (e.g., 0.75 mm plus or minus 0.1 mm). Prior to distortion under radial forces, an outside diameter of the subunit jacket 24 is between 4.4 mm and 4.8 mm, more specifically about 4.6 mm (e.g., 4.6 mm plus or minus 0.1 mm).

According to an exemplary embodiment, the optical fibers 20 are glass optical fibers, having a fiber optic core surrounded by a cladding. Some such glass optical fibers may also include one or more polymeric coatings. In accordance with aspects of the present disclosure, the optical fibers 20 may be single mode optical fiber in some embodiments, multi-mode optical fiber in other embodiments, a multi-core optical fiber in still other embodiments, or any combination therein. The optical fibers 20 may be bend resistant (e.g., bend insensitive optical fiber, such as Corning® SMF-28® Ultra optical fiber manufactured by Corning Incorporated of Corning, New York). The optical fibers 20 may have a diameter of 250 microns or less, such as 242 microns or less than 200 microns. The optical fiber 20 may be color-coated and/or tight-buffered. The optical fiber 20 may be one of several optical fibers aligned and bound together in a fiber ribbon form.

Referring now to FIGS. 1-2, the cable 10 includes an outer sheath 16 that may be formed from a thin film binder (e.g., membrane) surrounding the core 12, exterior to some or all of the cable subunits 14. The cable subunits 14 are at least partially constrained (i.e., held in place) and directly or indirectly bound to one another by the outer sheath 16. In some embodiments, the thin film outer sheath 16 directly contacts the cable subunits 14. For example, tension in the thin film outer sheath 16 may hold the outer group of six cable subunits 14 against the central cable subunit and/or one another. The loading of the thin film outer sheath 16 may further increase interfacial loading (e.g., friction) between the cable subunits 14 with respect to one another, thereby helping to constrain relative axial or radial movement of the cable subunits 14.

In accordance with aspects of the present disclosure, the thin film outer sheath 16 includes (e.g., is formed from, is formed primarily from, has some amount of) a polymeric material such as polyethylene (e.g., linear low-density polyethylene (LLDPE), low-density polyethylene (LDPE), medium density polyethylene (MDPE), high-density polyethylene (HDPE), polypropylene, polyurethane, or other polymers. In some embodiments, the thin film outer sheath 16 may include at least 70% by weight polyethylene, and may further include stabilizers, nucleation initiators, fillers, fire-retardant additives, reinforcement elements (e.g., chopped fiberglass fibers), and/or combinations of some or all such additional components or other components.

According to an exemplary embodiment, the thin film outer sheath 16 may be formed from a material having a Young's modulus of 3 gigapascals (GPa) or less. In other embodiments, the thin film outer sheath 16 is formed from a material having a Young's modulus of 5 GPa or less, 2 GPa or less, or a different elasticity, which may not be relatively high.

According to an exemplary embodiment, the thin film outer sheath 16 is thin, such as 0.5 mm or less in thickness. As shown in FIGS. 1 and 2, the outer sheath is approximately 0.35 mm thick (e.g., 0.35 mm plus or minus 0.05 mm). Accordingly, based on the size, dimension, and configuration of the preferred embodiments for cable 10 having seven cable subunits 14, as shown with respect to FIGS. 1 and 2, the bundled cable 10 has an outside diameter of less than 15 mm, preferably an outside diameter between 13 mm and 15 mm, more preferably between 13.1 mm and 14.5 mm, or more specifically about 13.8 mm (e.g., 13.8 mm plus or minus 0.7 mm).

The thickness of the thin film outer sheath 16 may not be uniform around cable subunits 14. For example, there may be some migration of the thin film material of the outer sheath 16 during manufacturing. For example, the belts (e.g., treads, tracks) of a typical caterpuller used during manufacture may impart compressive forces on the thin film material that may somewhat flatten the outer sheath 16 on opposing sides thereof, as the thin film material of the outer sheat 16 solidifies and contracts to hold the cable subunits 14 in the bundled configuration. As such, the "thickness" of the outer sheath 16, as used herein, is an average thickness around the cross-sectional periphery.

The cable subunits 14 of the cable 10 shown in FIGS. 1 and 2 are non-stranded. As shown more clearly in FIG. 2, the cable subunits 14 in this configuration are oriented generally in parallel with one another inside the thin film outer sheath 16. In accordance with other aspects of the present disclosure, some minimum level of stranding of the outer group of cable subunits 14 may be introduced to accommodate fiber attenuation performance parameters of the cable 10 when stored on a reel. Use of a relatively thin outer sheath 16 may allow for rapid cooling of the thin film outer sheath 16 to quickly hold the cable subunits 14 in place during manufacturing. The thin film outer sheath 16 constrains the cable subunits 14 in the stranded or non-stranded configuration and facilitates cable bending as well as mid-span or cable-end access of the cable subunits 14 and/or optical fibers 20 without the cable subunits 14 releasing tension by expanding outward from the access location or a bend in the core 12 of the cable 10.

Although not shown in FIG. 1 or 2, in accordance with other aspects of the present disclosure, alternative methods of providing access through the outer sheath 16 and/or the subunit jacket 24 may be used other than ripcords 26 and 28. For example, embedded material discontinuities, such as narrow strips of co-extruded polypropylene embedded in the sheath 16 and/or subunit jacket 24, may provide tear paths to facilitate opening the outer sheath 16 and/or subunit jacket 244.

In some embodiments, the thin film outer sheath 16 and the subunit jacket 24 are not colored the same as one another. For example, they may be colored with visually distinguishable colors, having a difference in "value" in the Munsell scale of at least 3. For example, the subunit jacket 24 may be black while thin film binder 16 may be white or yellow. In some contemplated embodiments, the subunit jacket 24 is opaque, such as colored black and/or including ultra-violet light blocking additives, such as carbon-black; but the thin film outer sheath 16 is translucent and/or a "natural"-colored polymer, without added color, such that less than 95% of visible light is reflected or absorbed by the thin film outer sheath 16. Accordingly, at least the outer group of cable subunits 14 are at least partially visible through the thin film outer sheath 16 while being constrained thereby with the thin film outer sheath 16 unopened and intact.

According to an exemplary embodiment, the thin film outer sheath 16 is continuous peripherally around the core 12, forming a continuous closed loop (e.g., closed tube) when viewed from the cross-section, as shown in FIGS. 1 and 2, and is also continuous lengthwise along a length of the cable 10, where the length of the cable 10 is at least 10 meters (m), such as at least 100 m, or at least 1000 m, and may be stored on a large spool. In other contemplated embodiments, the cable 10 may be less than 10 m long. The thin film outer sheath 16 may be applied such that a radial tension of the thin film outer sheath 16 has a distributed loading of at least 5 newtons per meter length of the cable 10.

The construction and arrangements of the cables, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. For example, in some embodiments, cables include multiple layers or levels of cable subunits may be provided, where each layer, subsequent to the central subunit or strength element, includes a thin film sheath 16 constraining the respective layer. In contemplated embodiments, the thin film outer sheath 16 is not extruded, but is formed from laser-welded tape and/or a heat shrink material, for example. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:

a core comprising a plurality of cable subunits configured such that an outer group of cable subunits surrounds a central cable subunit, wherein each cable subunit comprises:

a plurality of optical fibers;

a buffer tube surrounding the plurality of optical fibers, the plurality of optical fibers being loosely packed within the buffer tube;

a strength layer surrounding the buffer tube; and a subunit jacket surrounding the strength layer; and a thin film outer sheath surrounding the core, the thin film outer sheath comprising an inner surface and an outer surface, the inner surface being in contact with the outer group of cable subunits and the outer surface being an outermost surface of the fiber optic cable, wherein the thin film outer sheath is continuous peripherally around the outer group of cable subunits, forming a continuous closed loop when viewed in cross-section and continuous lengthwise along a length of the cable that is at least 10 meters, wherein the thin film outer sheath is in radial tension around the core such that the thin film outer sheath opposes outwardly transverse deflection of the cable subunits, and wherein the thin film outer sheath loads the outer group of cable subunits normally to the central cable subunit such that contact between the outer group of cable subunits and the central cable subunit provides coupling therebetween, limiting axial migration of the outer group of cable subunits relative to the central cable subunit.

2. The fiber optic cable of claim 1, wherein the radial tension of the thin film outer sheath has a distributed loading of at least 5 newtons per meter length of the cable.

3. The fiber optic cable of claim 1, wherein the outer group of cable subunits includes six cable subunits surrounding the central cable subunit for a total of seven cable subunits.

4. The fiber optic cable of claim 3, wherein the plurality of optical fibers includes at least four optical fibers in each buffer tube.

5. The fiber optic cable of claim 1, wherein the buffer tube has a radial wall thickness between 0.15 mm and 0.25 mm.

6. The fiber optic cable of claim 5, wherein the radial wall thickness of the buffer tube is about 0.20 mm.

7. The fiber optic cable of claim 1, wherein an outside diameter of the buffer tube is between 1.6 mm and 1.8 mm prior to distortion under radial forces.

8. The fiber optic cable of claim 7, wherein an outside diameter of the buffer tube is about 1.7 mm.

9. The fiber optic cable of claim 1, wherein an inner diameter of the buffer tube is between 1.2 mm and 1.3 mm.

10. The fiber optic cable of claim 9, wherein the inner diameter of the buffer tube is about 1.3 mm.

11. The fiber optic cable of claim 1, wherein a ratio of the inner diameter to the outer diameter of the buffer tube is 0.8 plus or minus 0.1.

12. The fiber optic cable of claim 1, wherein the thin film outer sheath has a thickness of 0.5 mm or less.

13. The fiber optic cable of claim 12, wherein the thickness of the thin film outer sheath is 0.35 mm plus or minus 0.05 mm.

14. The fiber optic cable of claim 1, wherein the fiber optic cable has an outside diameter of 13.8 mm plus or minus 0.7 mm.

15. The fiber optic cable of claim 12, wherein the thin film outer sheath comprises one or more ripcords provided in the thin film outer sheath.

16. The fiber optic cable of claim 1, wherein the thin film outer sheath is formed from a material having a Young's modulus of 3 GPa or less.

17. The fiber optic cable of claim 12, wherein the thin film outer sheath is formed primarily from a polyethylene material and comprises strips of co-extruded polypropylene to facilitate opening of the thin film outer sheath.

18. The fiber optic cable of claim 1, wherein the thin film outer sheath is visually distinguishable from the subunit jacket of each cable subunit.

19. The fiber optic cable of claim 18, wherein the thin film outer sheath comprises a difference in value on the Munsell scale of at least 3 relative to each subunit jacket.

20. The fiber optic cable of claim 1, wherein one or more optical fibers of the plurality of optical fibers of at least one cable subunit are tight-buffered optical fibers loosely packed within the buffer tube of the at least one cable subunit.

21. The fiber optic cable of claim 1, wherein the plurality of optical fibers comprises bend insensitive optical fibers.

22. The fiber optic cable of claim 21, wherein the bend instensitive optical fibers comprise a diameter of less than 200 microns.

* * * * *